(12) United States Patent
Ahn et al.

(10) Patent No.: US 12,303,743 B2
(45) Date of Patent: May 20, 2025

(54) REAL-TIME COACHING SYSTEM

(71) Applicants: Sang Joon Ahn, Seoul (KR); Bong Soo Han, Seoul (KR)

(72) Inventors: Sang Joon Ahn, Seoul (KR); Bong Soo Han, Seoul (KR)

( * ) Notice: Subject to any disclaimer, the term of this patent is extended or adjusted under 35 U.S.C. 154(b) by 0 days.

(21) Appl. No.: 18/574,342

(22) PCT Filed: Jun. 29, 2022

(86) PCT No.: PCT/KR2022/009298
§ 371 (c)(1),
(2) Date: Dec. 27, 2023

(87) PCT Pub. No.: WO2023/277563
PCT Pub. Date: Jan. 5, 2023

(65) Prior Publication Data
US 2024/0269514 A1    Aug. 15, 2024

(30) Foreign Application Priority Data

Jun. 29, 2021  (KR) .................. 10-2021-0084677

(51) Int. Cl.
 *A63B 24/00* (2006.01)
 *H04N 21/4223* (2011.01)
 *H04N 21/4227* (2011.01)

(52) U.S. Cl.
CPC ..... *A63B 24/0075* (2013.01); *H04N 21/4223* (2013.01); *H04N 21/4227* (2013.01); *A63B 2024/0081* (2013.01)

(58) Field of Classification Search
CPC ........ A63B 24/0075; A63B 2024/0081; H04N 21/4223; H04N 21/4227

USPC .......................................................... 700/91
See application file for complete search history.

(56) References Cited

U.S. PATENT DOCUMENTS

2018/0301169 A1* 10/2018 Ricciardi ............. G11B 27/036
2019/0267041 A1*  8/2019 Ricciardi ......... H04N 21/23418

FOREIGN PATENT DOCUMENTS

| KR | 20120077538 A | 7/2012 |
| KR | 20160082164 A | 7/2016 |
| KR | 20180091280 A | 8/2018 |

(Continued)

OTHER PUBLICATIONS

Notice of Allowance of KIPO for Korean application No. 10-2021-0084677 issued on Oct. 21, 2022.

(Continued)

*Primary Examiner* — Pierre E Elisca
(74) *Attorney, Agent, or Firm* — Byungwoong Park; ZION IP

(57) ABSTRACT

The present invention relates to a real-time coaching system and method and, more particularly, to a real-time coaching system and method for coaching in real time by reflecting collective intelligence of a plurality of participants to a sports game. The real-time coaching system and method generate real-time coaching data regarding poll data and strategy/tactics to intervene or participate in a game according to a pre-determined rule, on the basis of information collected from a set-top box, a computer, and a smart phone, and provide the generated real-time coaching data to a scene of the game.

6 Claims, 5 Drawing Sheets

(56) References Cited

FOREIGN PATENT DOCUMENTS

| | | |
|---|---|---|
| KR | 101925007 B1 | 12/2018 |
| KR | 20210008698 A | 1/2021 |

OTHER PUBLICATIONS

Office Action of KIPO for Korean application No. 10-2021-0084677 issued on Jul. 22, 2022.

* cited by examiner

REAL-TIME COACHING SYSTEM

TECHNICAL FIELD

The present disclosure relates to a real-time coaching system and method and, more particularly, to a real-time coaching system and method for coaching in real time by reflecting collective intelligence of a plurality of participants to a sports game.

The real-time coaching system and method generate real-time coaching data regarding poll data and strategy/tactics to intervene or participate in a game according to a predetermined rule, on the basis of information collected from a set-top box, a computer, and a smart phone, and provide the generated real-time coaching data to a scene of the game.

BACKGROUND ART

In the case of Patent Document 1 related to the present disclosure, for example, a sports game remote judging service system and method, the conventional technology provides game footages to a client and offers a remote judging service for a sports game using a remote judging terminal capable of making a remote judgment.

The conventional sports game remote judging service system and method merely provide a video reading system remotely, failing to provide real-time coaching data based on feedback information such as votes, strategies, points, as in the present disclosure. In addition, Patent Document 2 relating to a system and method for a sports broadcast service via a network caters to user opinions during sports broadcasts but does not provide real-time coaching data to physically present participants like coaches, supervisors, or players at an actual sports game venue.

SUMMARY

The objective of the present disclosure is to generate real-time coaching data using information collected from participants at a sports game venue (players+coaches+spectators) or users watching the game remotely through broadcast or Internet streaming, and to provide the generated real-time coaching data to thereby provide a real-time coaching system and method that reflect collective intelligence in a game management process.

In addition, another objective of the present disclosure is to provide a real-time coaching system and method that employ communication connections between servers and clients for managing information on a vote, a strategy, and points, thus generating real-time coaching data that reflects collective intelligence in sports games.

A preferred real-time coaching system and method of the present disclosure includes: an analysis module (10) configured to perform player analysis, tactical/strategy analysis, and coaching participant history analysis based on information collected from fan participants (30); a tally module (20) responsible for information analysis and real-time tally of the real-time coaching system (1); a receiver (40) configured to collect information from a set-top box (140), a computer (150), and a smartphone (160) and provide the collected information to the tally module; and a coaching data generation module (30) configured to generate coaching data of recommended players, recommended strategies, and past history information based on information collected by the analysis module (10), the tally module (20), and the receiver (40), and provide the generated coaching data to a sports game venue (60).

In addition, the tally module (20) includes a real-time tally module (21) configured to provide real-time data to the coaching data generation module (30) through information analysis.

In addition, the real-time coaching system (1) includes a video reading system composed of a plurality of cameras (2), and provides camera image information of the video reading system to a client (220) so that a user watches the camera image information, and the client (220) receives the camera image information provided by the real-time coaching system (1), displays the camera image information on a display, selects and plays camera image information based on a user input through a user interface, and provides judgment information to the real-time coaching system (1).

In addition, the real-time coaching system (1) includes: a server (210) configured to interact with on-site participants (players+coaches+spectators) connected to a broadcast network (120), generate real-time coaching data by collecting, analyzing, and processing information from the set-top box (140), computer (150), and smartphone (160) connected to the internet (130), and provide the generated real-time coaching data to the on-site participants through the broadcast network (120) or the internet (130); and a client (220) composed of the set-top box, the computer, and the smartphone corresponding to the server.

In addition, the real-time coaching system (1) collects a vote and a strategy from the client (220) through a communication connection between the server (210) and the client (220), and the server generates real-time coaching data through a poll tally, strategies/tactics, and point settlement and provides the real-time coaching data to a sports game venue (60).

In addition, the server (210) includes an operating system (OS) (211), an https (HyperText Transfer Protocol over Secure Socket Layer) (212), a socket (213), and an application (App) (214), and the client (220) includes a Java Virtual Machine (JVM) (221), an https (222), a socket (223), and an App (224), and the OS (211) provides software resources to the App (214), the https (212) provides an Internet communication service, the socket (213) provides a communication connection, the App (214) is an application that handles a poll tally, strategy collection, and point settlement of the server (210), and the JVM (221) is a Java virtual machine, the https (222) provides Internet communication services, the socket (223) provides communication connections, and the App (224) is an application that handles a vote, a strategy, and points of the client (220).

In addition, the client (220) includes an architecture of a vote (610), a point (620), a bulletin board (630), a strategic instruction (640), and a blockchain (650), and the server (210) includes an architecture of a poll tally (710), point settlement (720), bulletin board management (730), strategy collection (740), and a blockchain (750).

In addition, the blockchain (650, 750) authenticates information generated between the server (210) and the client (220) and increases reliability of the information (610) by making the information (610) a blockchain.

The present disclosure provides real-time coaching data generated based on information collected from on-site participants (players+coaches+spectators) and users to a sports game venue, thereby introducing collective intelligence into a sports game and encouraging user participation and multiplying the fun of watching sports.

In addition, the present disclosure may have the effect of reflecting collective intelligence in a sports game, improving game operations, immersing viewers in the game, and securing the reliability of real-time coaching data applied to the sports game.

DETAILED DESCRIPTION OF EXEMPLARY EMBODIMENTS

Hereinafter, a real-time coaching system and method according to a preferred embodiment of the present disclosure will be described in detail with reference to the drawings. Below, descriptions of conventionally known matters are omitted or simplified to clarify the gist of the present disclosure. The components included in the description of the present disclosure operate individually or in combination.

Figure 1:
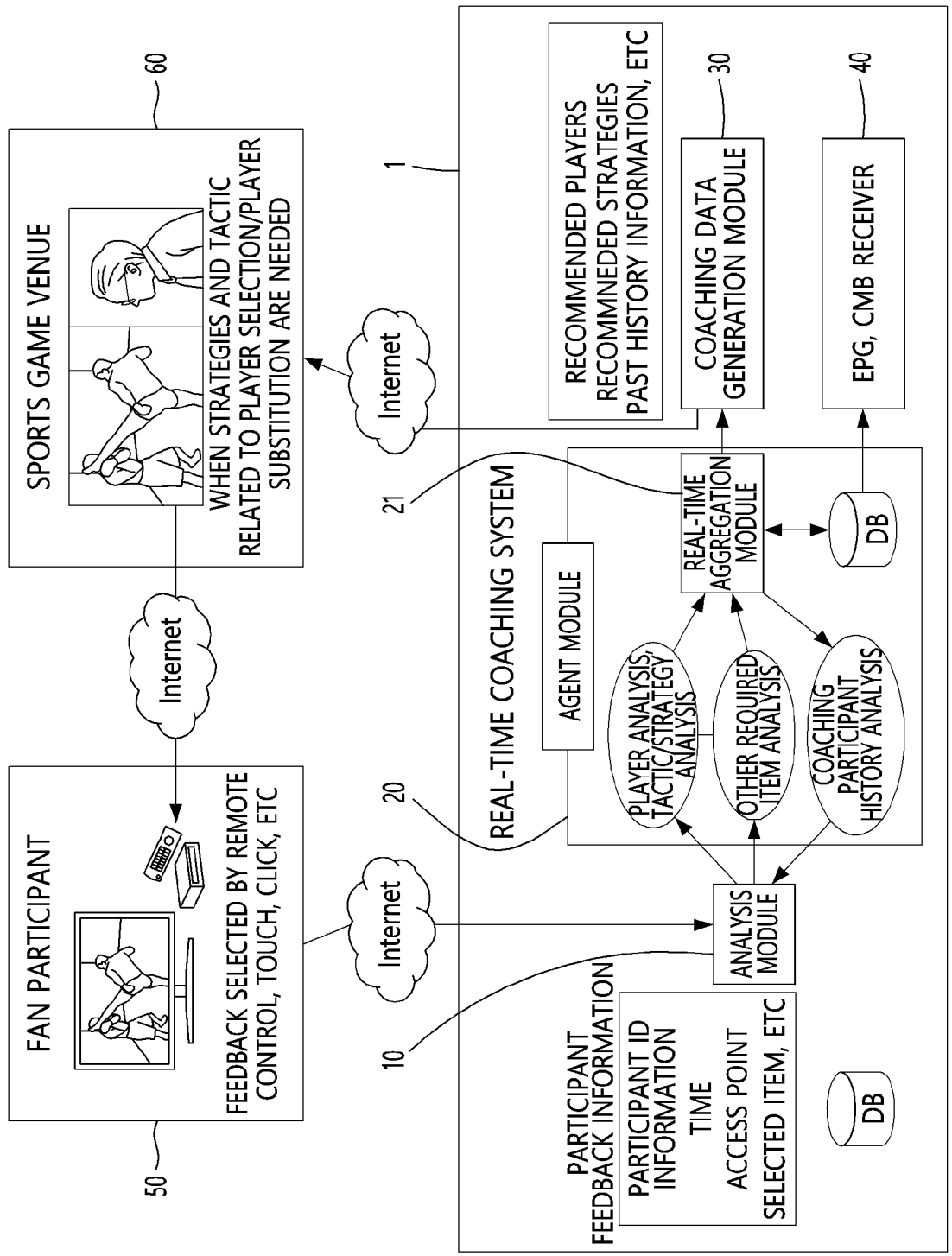
FIG. 1 is a block diagram illustrating a configuration of the real-time coaching system of the present disclosure.

FIG. 1 is a block diagram illustrating a configuration of the real-time coaching system of the present disclosure. Referring to FIG. 1, a real-time coaching system 1 includes an analysis module 10, a tally module 20, a real-time tally module 21, a coaching data generation module 30, and a receiver 40.

The analysis module 10 performs player analysis, tactical/strategy analysis, and coaching participant history analysis based on information collected from fan participants 30, the tally module 20 performs information analysis and real-time tally of the real-time coaching system 1, the real-time counting module 21 provides real-time data to the coaching data generation module 30 through information analysis, and the coaching data generation module 30 generates coaching data on recommended players, recommendation strategies, and past history information and provides the generated coaching data to a sports game venue 60. The receiver 40 collects information from a set-top box 140, a computer 150, and a smartphone 160 and provides the collected information to the tally module 20.

Figure 2:
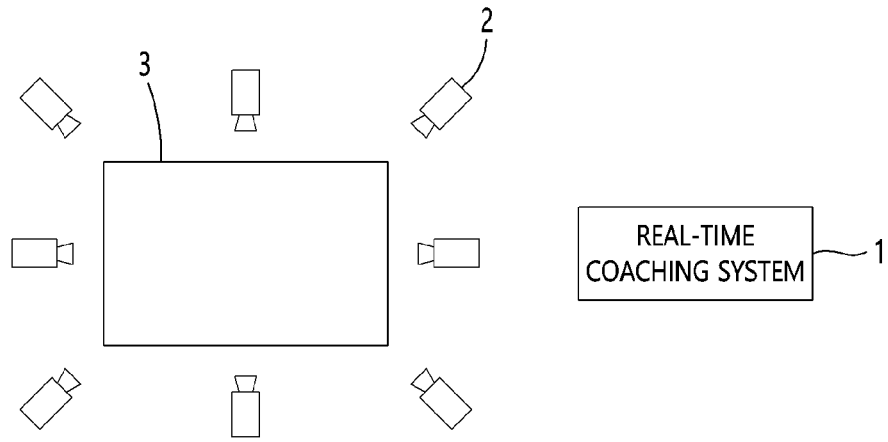
FIG. 2 is an exemplary diagram illustrating a video reading system of a real-time coaching system of the present disclosure.

FIG. 2 is an exemplary diagram illustrating a video reading system of a real-time coaching system of the present disclosure. Referring to FIG. 2, a video shooting and transmission system includes a stadium 3, cameras 2, and a real-time coaching system 1.

In the stadium 3, the cameras 2 are installed at various shooting angles, each equipped with the video shooting and transmission system. The video shooting and transmission or reading system composed of a plurality of cameras 2 interacts with the real-time coaching system 1, and the real-time coaching system 1 provides camera image information of the video reading system to a client 220, enabling a user to watch the camera image information and providing information to interpret contentious judgments during a sports game. The client 220 receives the camera image information provided by the real-time coaching system 1, displays the received camera image information on a display, selects and plays a piece of camera image information based on a user input through a user interface, and provides judgment information to the real-time coaching system 1. The real-time coaching system 1 collects the judgment information and determine whether or not a right judgement has been made in the sports game by taking into account all the collected judgment information.

The proposed real-time coaching system may be generally applied to sports involving large numbers of participants, such as soccer, volleyball, basketball, baseball, and martial arts, as well as to one-on-one games.

Figure 3:
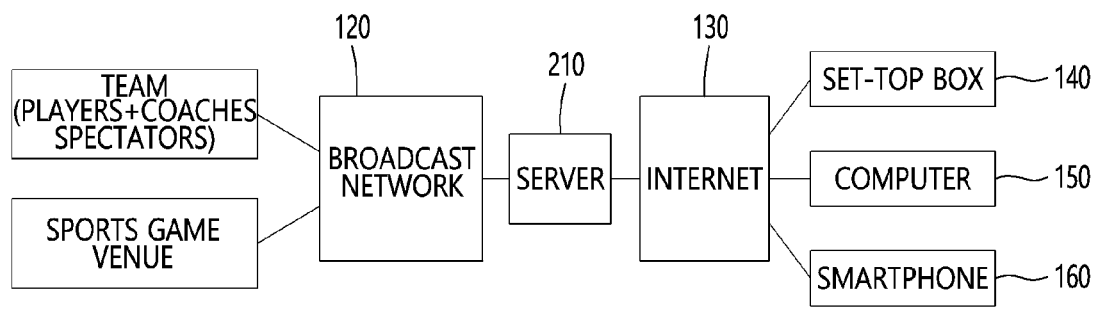
FIG. 3 is an exemplary diagram illustrating a configuration of a communication network of a real-time coaching system of the present disclosure.

FIG. 3 is an exemplary diagram illustrating a configuration of a communication network of a real-time coaching system of the present disclosure. Referring to FIG. 3, a communication network of a real-time coaching system 1 includes a server 210, a broadcasting network 120, the Internet 130, a set-top box 140, a computer 150, and a smartphone 160.

The coaching server 210 interacts with on-site participants (players+coaches+spectators) connected to the broadcasting network 120, generate real-time coaching data by collecting information from the set-top box 140, computer 150, and smartphone 160 connected to the internet 130, and provides the generated real-time coaching data to the on-site participants through the broadcasting network 120 or the internet 130.

The set-top box 140, the computer 150, and the smartphone 160 are installed at home or at work or carried by a user and transmit information on polls, strategies, and points to a server 210. The set-top box 140, the computer 150, and the smartphone 160 operate as the client 220 corresponding to the server 210. The real-time coaching system 1 collects a vote and a strategy from the client 220 through a communication connection between the server 210 and the client 220, and the server 210 generates real-time coaching data through a poll tally, feedback data collection regarding the strategies/tactics, and point settlement, and provides the real-time coaching data to a sports game venue 60.

the sports game venue 60 may be connected to the server 210 through a broadcast network or the Internet. the sports game venue 60 receives the real-time coaching data from the server 210 and reflects the real-time coaching data in a sports game. The real-time coaching data includes player substitutions, timeouts, tactical instructions, and the like.

Figure 4:
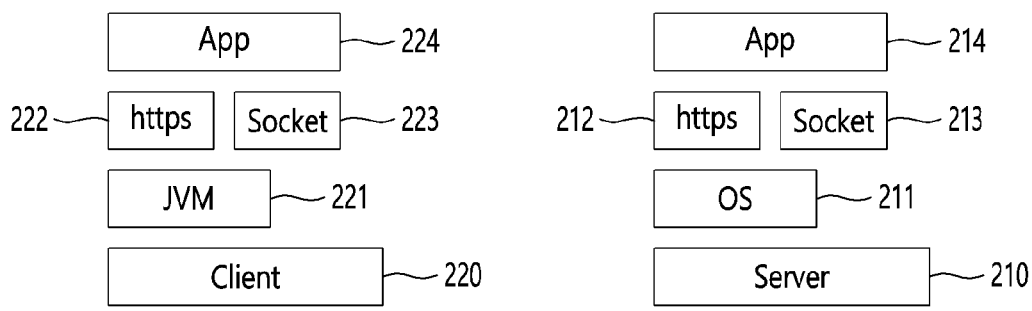
FIG. 4 is a block diagram illustrating the structure between a server and a client of the real-time coaching system.

FIG. 4 is a block diagram illustrating the structure between a server and a client of the real-time coaching system. Referring to FIG. 4, a server 210 and a client 220 are included.

A server 210 includes an operating system (OS) 211, an https (HyperText Transfer Protocol over Secure Socket Layer) 212, a socket 213, and an application (App) 214, while the client 220 includes a Java Virtual Machine (JVM) 221, an https 222, a socket 223, and an App 224.

The OS 211 provides software resources to the App 214, the https 212 provides an Internet communication service, the socket 213 provides a communication connection, the App 214 is an application that handles a poll tally, strategy collection, and point settlement of the server 210.

The JVM 221 is a Java virtual machine (used as an example for Android, not included for iPhone), the https 222 provides Internet communication services, the socket 223 provides communication connections, and the App 224 is an application that handles polls, strategies, and points of the client 220. The App 224 is driven by an asynchronous process using the socket 223.

Figure 5:
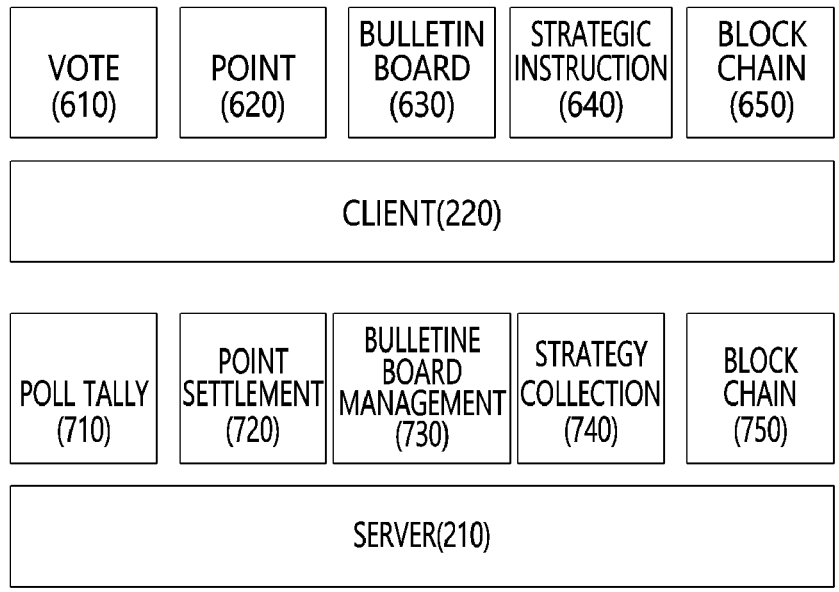
FIG. 5 is a block diagram illustrating architectures of a server and a client.

FIG. 5 is a block diagram illustrating architectures of a server and a client. Referring to FIG. 5, the client 220 includes a vote 610, points 620, a bulletin board 630, strategic instruction 640, and a blockchain 650, and the server 210 includes a poll tally 710, point settlement 720, bulletin board management 730, strategy collection 740, and a blockchain 750.

The vote 610 is a real-time vote corresponding to the poll tally 710 of the server 210, the points 620 are the point status and consumption according to the point settlement of the server 210, the bulletin board 630 is a social networking service (SNS) activity of a user in response to the real-time coaching, the strategic instruction 640 is strategic instructions of the real-time coaching, and the blockchain 650 is information management of votes and strategic instructions.

The poll tally 710 tallies the vote from the client 220, the point settlement 720 performs point settlement for activities of the client 220, the bulletin board management 730 manages the user's SNS activities, the strategy collection 740 collects strategies from the client 220, and the blockchain 750 manages information on a vote and a strategic instruction of the client 220. The strategies correspond to long-term rules and include tactics to be applied in real time. A tactic being applied means that the tactic based on sports game rules can be selected.

Figure 6:
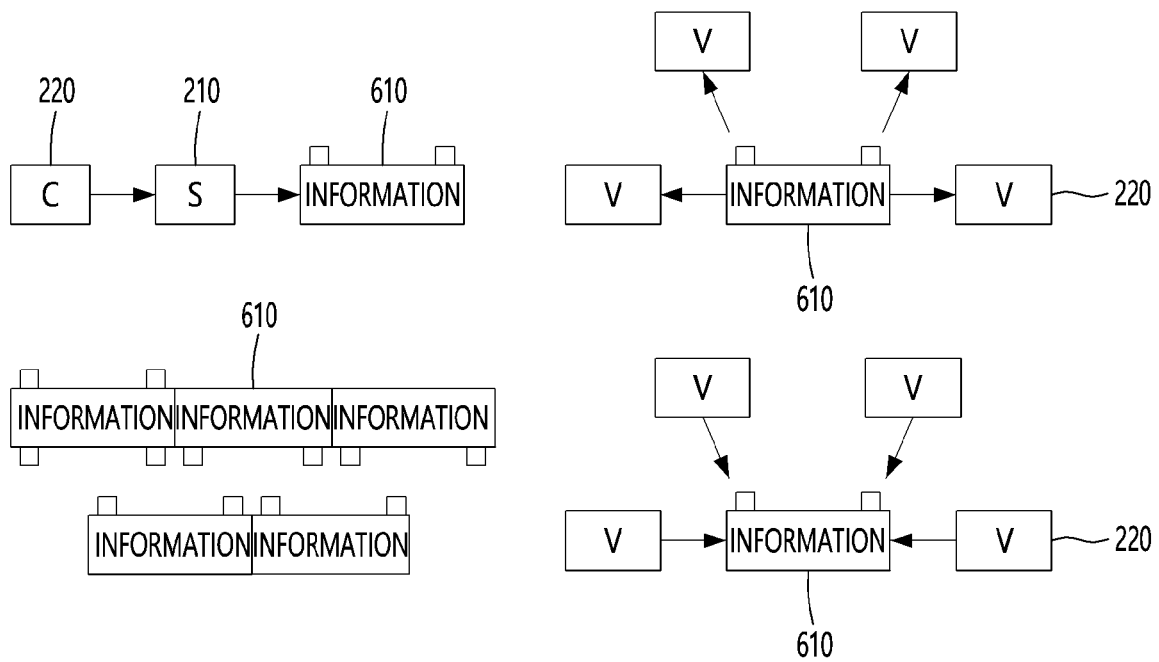
FIG. 6 is an exemplary diagram illustrating a blockchain of a real-time coaching system of the present disclosure.

FIG. 6 is an exemplary diagram illustrating a blockchain of a real-time coaching system of the present disclosure. Referring to FIG. 6, the blockchain of the real-time coaching system mutually authenticates information 610 generated between the server 210 and the client 220 and increases the reliability of the information 610 by making the information 610 a blockchain. Blockchain originated as a financial technique, and by organizing various pieces of information into the block chain, it is possible to prevent duplication and theft of the information, ensuring reliability.

The real-time coaching system 1 manages the information 610 through blockchain to prevent duplication, theft, and contamination of information generated from sports games and real-time coaching information. The blockchain has a structure in which the units of the information 610 are organized into blocks, the blocks are chained together, and the blocks are stored distributedly on the client, thereby enhancing the security of the blockchain-linked real-time coaching information, which cannot be duplicated, stolen, or contaminated without hacking the entire network.

Figure 7:
FIG. 7 is an example of a sports game screen for voting for real-time coaching, such as player substitutions, in the middle of a match.

FIG. 7 is an exemplary diagram illustrating a sports game screen. Referring to FIG. 7, a sports game screen 310 to which a real-time coaching system 1 is applied may display a player substitution menu 320 at the bottom, and if the player substitution menu 320 is selected, a poll may take place. Although the player substitution menu 320 is used as an example in FIG. 6, the real-time coaching system 1 may display various real-time coaching-related menus and statuses, such as voting, strategic instructions, bulletin boards, points, and the like, overlapping on a sports game screen 310.

Figure 8:
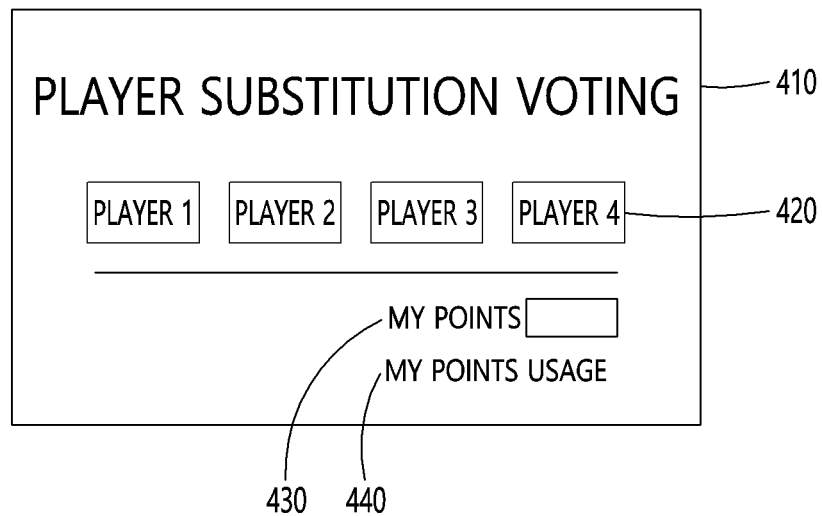
FIG. 8 is an exemplary diagram illustrating a voting screen for selecting players before the start of a match.

FIG. 8 is an exemplary diagram illustrating a player voting screen. Referring to FIG. 8, a player voting screen 410 includes Players 420, My Points 430, and My Points Usage 440.

The Player 420 is a list of players who are playing and waiting to play in a sporting event, the My Points 430 is the status of points the user has, and the My Points Usage 440 is the status of points to be used on a player to vote for from the player list. The player voting screen 410 is displayed when voting is taking place in the real-time coaching system 1, and allows a user to vote for a substitute from among standby players, and a player with the highest number of votes may be selected as a substituted player. While FIG. 8 illustrates player voting, in other embodiments, tactic selection, a strategic instruction, timeouts, and the like may be posted. The tactic selection is a tactic selection based on sports game rules, the strategic instruction is a long-term strategy, and the timeout is a timeout to be executed during a sporting event.

Figure 9:
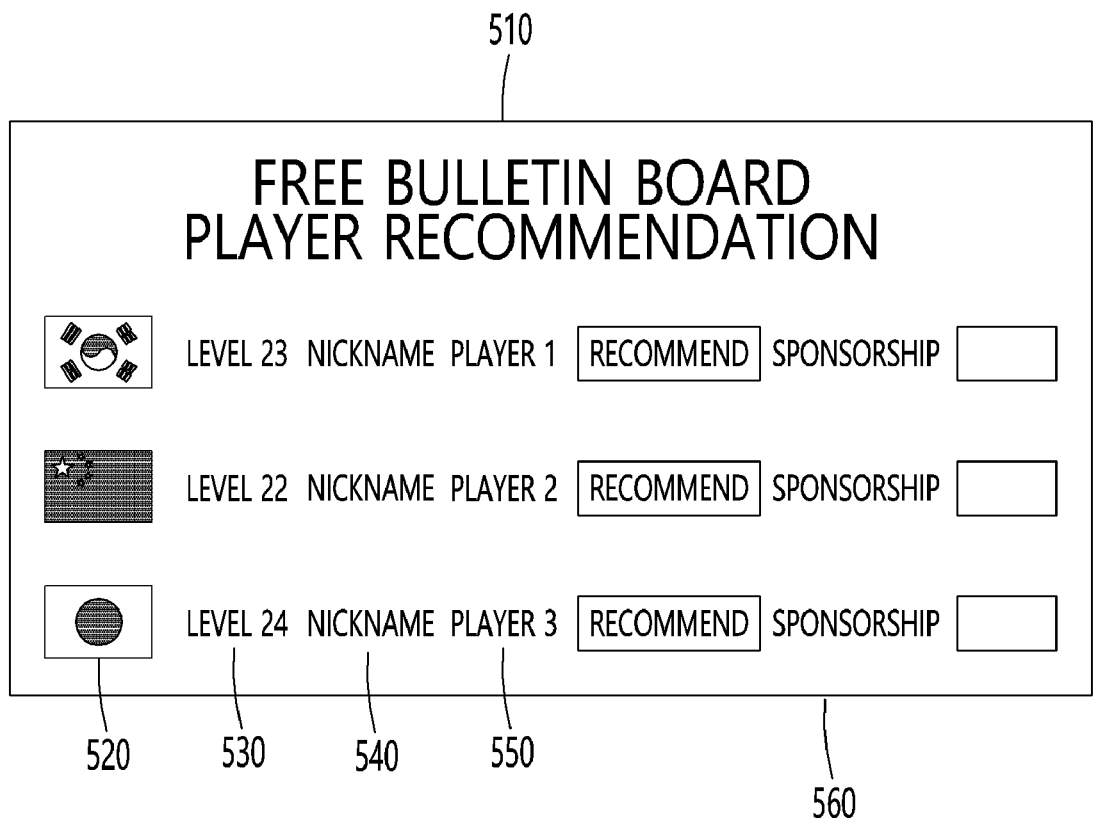
FIG. 9 is an exemplary diagram illustrating a process for describing more complex strategies and tactics than multiple-choice selections, such as player selection or player substitution, and encouraging viewer participation (voting, etc.).

FIG. 9 is an exemplary diagram illustrating free bulletin board player recommendation. Referring to FIG. 9, free bulletin board player recommendation 510 includes a nationality 520, a level 530, a nickname 540, an athlete 550, and a sponsorship 560.

The nationality 520 represents the nationality of a user participating in a real-time coaching system 1, the level 530 represents a participation index, the nickname 540 is the user's ID, the player 550 is the name of the player recommended by the user, and the sponsorship 560 is the number of points sponsored for the player recommended by the user. The user may recommend a player he or she wants through the free bulletin board player recommendation, and based on the performance of the recommended player in sports matches, the user may earn points as a reward. While FIG. 9 illustrates the free bulletin board player recommendation, in other embodiments, various uses of bulletin board such as private bulletin board, tactical/strategy discussion, player recruitment, and the like are possible.

The present disclosure is not limited to the specific preferred embodiments described above, and those skilled in the art will be able to variously modify and change the present disclosure without departing from the spirit and scope of the present disclosure as set forth in the claims below.

What is claimed is:

1. A real-time coaching system comprising:
    a processor and one or more memory devices communicatively coupled to the processor, and the one or more memory devices stores instructions operable when executed by the processor to perform:
    player analysis, tactical/strategy analysis, and coaching participant history analysis based on information collected from fan participants;
    being responsible for information analysis and real-time tally of the real-time coaching system;
    collecting information from a set-top box, a computer, and a smartphone and providing the collected information;
    generating coaching data of recommended players, recommended strategies, and past history information based on the collected information, and providing the generated coaching data;
    wherein the real-time coaching system further comprises:
    a server configured to interact with on-site participants (players, coaches and spectators) connected to a broadcast network, generate real-time coaching data by collecting, analyzing, and processing information from the set-top box, computer, and smartphone connected to the internet, and provide the generated real-time coaching data to the on-site participants through the broadcast network or the internet; and a client composed of the set-top box, the computer, and the smartphone corresponding to the server, wherein the real-time coaching system collects a vote and a strategy from the client through a communication connection between the server and the client, and the server generates real-time coaching data through a poll tally, strategies/tactics, and point settlement and provides the real-time coaching data to a sports game venue.

2. The real-time coaching system of claim 1, wherein the one or more memory devices stores the instructions operable when executed by the processor to perform providing real-time data information analysis.

3. The real-time coaching system of claim 1,
wherein the real-time coaching system comprises a video reading system composed of a plurality of cameras, and provides camera image information of the video reading system to a client so that a user watches the camera image information, and
wherein the client receives the camera image information provided by the real-time coaching system, displays the camera image information on a display, selects and plays camera image information based on a user input through a user interface, and provides judgment information to the real-time coaching system.

4. The real-time coaching system of claim 1,
wherein the server comprises an operating system (OS), an https (HyperText Transfer Protocol over Secure Socket Layer), a socket, and an application (App), and the client comprises a Java Virtual Machine (JVM), an https, a socket, and an App, and
wherein the OS provides software resources to the App, the https provides an Internet communication service, the socket provides a communication connection, the App is an application that handles a poll tally, strategy collection, and point settlement of the server, and
wherein the JVM is a Java virtual machine, the https provides Internet communication services, the socket provides communication connections, and the App is an application that handles a vote, a strategy, and points of the client.

5. The real-time coaching system of claim 1,
wherein the client comprises an architecture of a vote, a point, a bulletin board, a strategic instruction, and a blockchain, and
wherein the server comprises an architecture of a poll tally, point settlement, bulletin board management, strategy collection, and a blockchain.

6. The real-time coaching system of claim 5, wherein the blockchain authenticates information generated between the server and the client and increases reliability of the information by making the information a blockchain.

* * * * *